United States Patent [19]

Meeker et al.

[11] 3,735,154

[45] May 22, 1973

[54] DISABLING CIRCUIT HAVING A PREDETERMINED DISABLING INTERVAL

[75] Inventors: George W. Meeker, Silver Spring; Allan E. Pertman, Baltimore, both of Md.

[73] Assignee: The United States of America as represented by the Secretary of the Navy, Washington, D.C.

[22] Filed: Nov. 19, 1971

[21] Appl. No.: 200,534

Related U.S. Application Data

[63] Continuation of Ser. No. 866,303, Oct. 4, 1969, abandoned.

[52] U.S. Cl. ..................307/273, 307/229, 307/247, 307/260, 307/279

[51] Int. Cl. ..............................................H03k 3/10

[58] Field of Search......................307/217, 228, 229, 307/247, 260, 273, 279

[56] References Cited

UNITED STATES PATENTS

| | | | |
|---|---|---|---|
| 3,124,706 | 3/1964 | Alexander | 307/228 |
| 3,364,441 | 1/1968 | Rogers | 307/293 X |
| 3,294,982 | 12/1966 | Russo | 307/273 X |
| 3,244,906 | 4/1966 | Goering | 307/273 X |
| 3,584,311 | 6/1971 | Schaffer | 307/273 X |

*Primary Examiner*—Stanley D. Miller, Jr.
*Attorney*—R. S. Sciascia and J. O. Tresansky

[57] ABSTRACT

A disabling circuit having an integrator-threshold device, a pulse generator such as a monostable multivibrator and a shaper for delivering an output pulse to a load. A feedback path including a semiconductive switch element from the output of the multivibrator to the integrator-threshold device inhibits operation of the integrator for a predetermined time interval determined by the duration of the multivibrator pulse. The monostable multivibrator includes semiconductive circuitry which draws no power in the OFF condition and further includes a FET to insure rapid transition from the ON mode to the OFF mode of operation.

1 Claim, 7 Drawing Figures

Patented May 22, 1973 | 3,735,154

2 Sheets-Sheet 1

INVENTORS
George W. Meeker
Allan E. Pertman

BY

J. O. Tresansky
ATTORNEY

Patented May 22, 1973 3,735,154

2 Sheets-Sheet 2

INVENTORS
George W. Meeker
Allan E. Pertman

DISABLING CIRCUIT HAVING A PREDETERMINED DISABLING INTERVAL

This application is a continuation of Ser. No. 866,303, filed Oct. 4, 1969, now abandoned.

BACKGROUND OF THE INVENTION

This invention relates generally to disabling circuitry and more particularly to a disabling circuit providing a predetermined disabling time interval.

The use of disabling systems utilizing electronic circuit components are well known in the art. These systems have been utilized to disconnect an input from an output for a particular time interval which may be termed the disabling interval. These prior art disabling systems and the circuitry associated therewith, however, have exhibited an undesirable slow response time. More specifically, these systems have both turned ON slowly and turned OFF slowly responsive to an input signal applied thereto. Furthermore, these systems have drained considerable power during the OFF state and, therefore, have proven themselves to be inefficient and somewhat undesirable.

SUMMARY OF THE INVENTION

Accordingly, one object of the invention is to provide an improved disabling circuit.

Another object of the present invention is to provide a disabling circuit providing a quick response time for both its turn ON and turn OFF modes of operation.

A still further object of the instant invention is to provide a disabling circuit which draws no power in its OFF state.

A yet another object of the present invention is to provide a more efficient disabling circuit.

Still another object of the instant invention is to provide a disabling circuit exhibiting a predetermined disabling time interval.

A further object of the present invention is to provide a monostable multivibrator exhibiting no power drain and quick response time.

These and other objects of the present invention are obtained by providing a disabling circuit including a pulse producing generator to provide a predetermined disabling pulse and a feedback loop responsive to the pulse generator for disabling an input circuit while the pulse generator is producing the disabling pulse.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figures 1, 2:
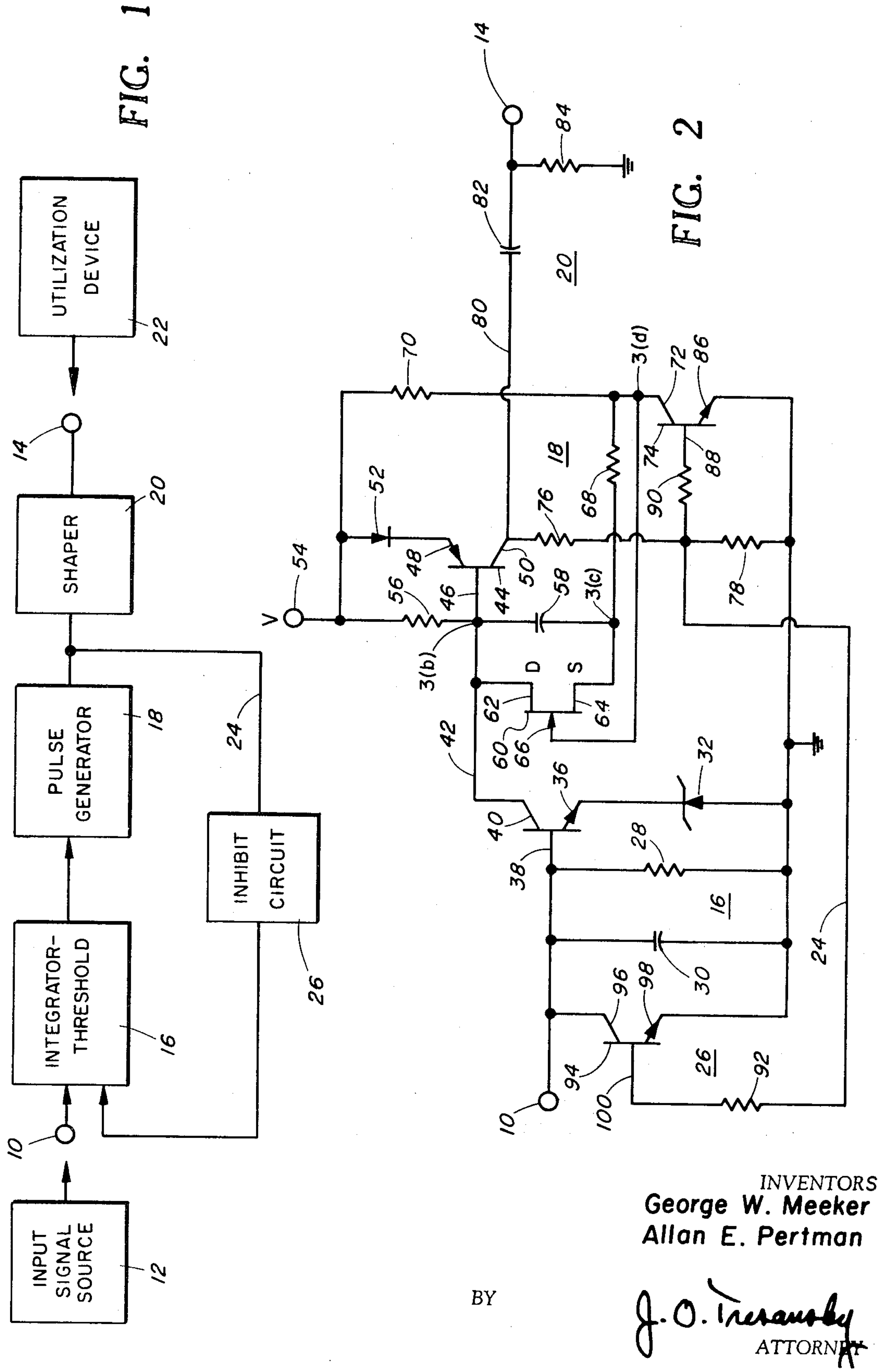
FIG. 1 is a block diagrammatic view of the disabling circuit system according to the present invention.
FIG. 2 is a circuit schematic view of the disabling circuit system according to the present invention; and, FIGS. 3(*a*)–3(*e*) are a graphical view showing various signal waveforms in the system of the present invention.
Figure 3A:
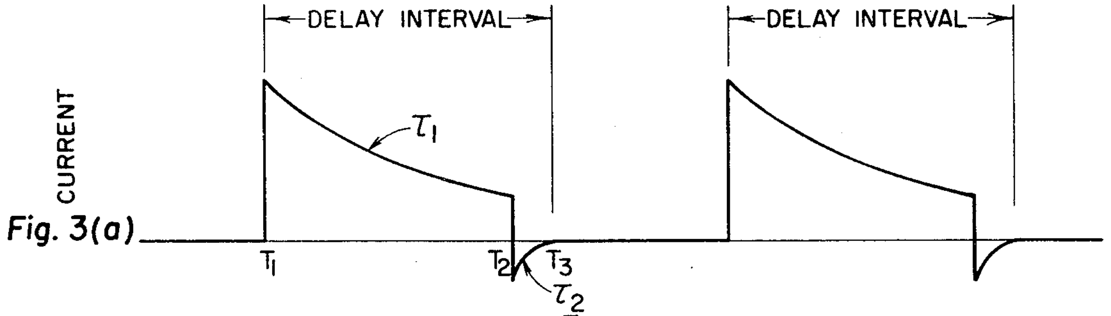
Figure 3B:
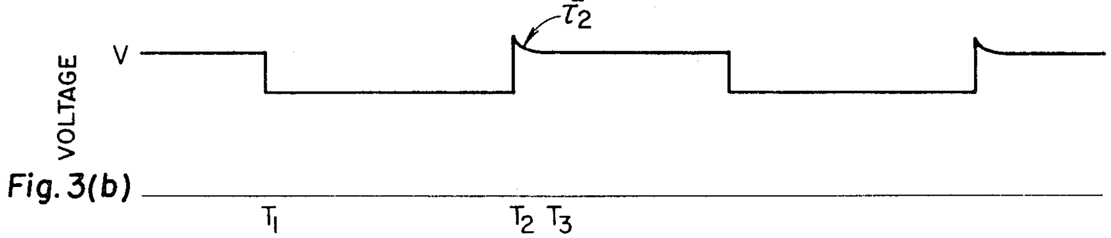
Figure 3C:
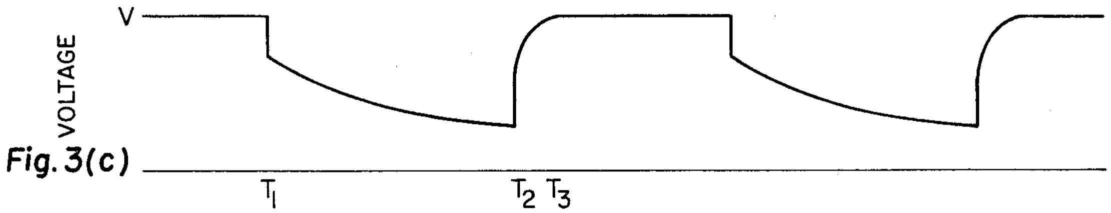
Figure 3D:
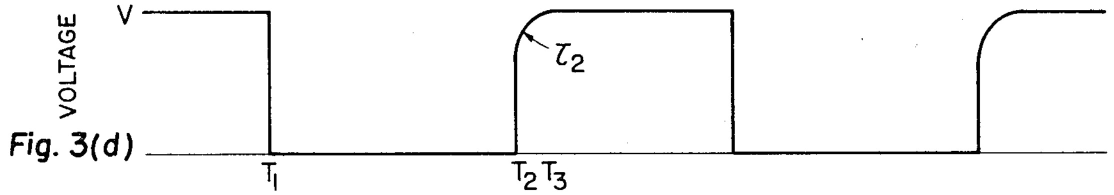
Figure 3E:
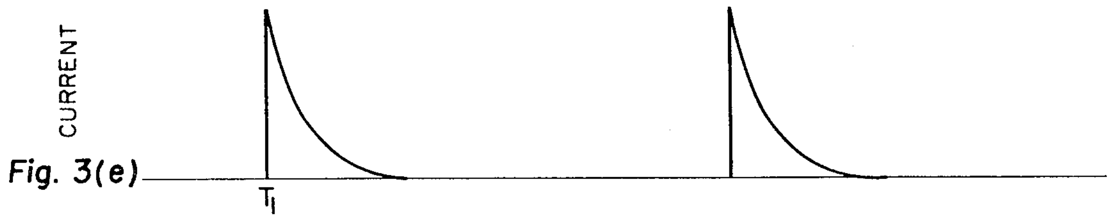

Referring now to the drawings, wherein like reference numerals designate corresponding elements throughout, and more particularly to FIG. 1 thereof, the disabling circuit is shown as including an input terminal 10 which is connectable to a source 12 of input signals. By way of example, input source 12 may provide a randomly sensed signal or a predetermined pulse train signal or any other signal of electrical energy adapted, as hereinafter more fully explained, to provide a signal at an output terminal 14. The signal at terminal 14 may be obtained from input terminal 10 via an integrator and threshold circuit 16 connected thereto which may activate a pulse generator 18 coupled to the integrator-threshold when a certain number of input signals or a signal of at least a predetermined duration is available at terminal 10 from the source. A shaper 20 may be inserted, intermediate of the pulse generator and the output terminal, to modify an output pulse provided by the pulse generator.

Terminal 14 is connectable to a utilization device 22 which may be responsive to the signal at terminal 14 and, therefore, to the input 10 available from source 12. Thus, utilization device 22 may be a transmission line, a signal generator or the like responsive to the signal of input source 12.

Often, however, it may be undesirable for utilization device 22 to be responsive to all signals provided by input source 12. Thus, it may be desirable to render the utilization device non-responsive to the input at terminal 10 for a predetermined period of time which may be termed the disabling interval. More specifically, the occurrence of this disabling interval may depend on the activation of the utilization device and hence the signal available from the input source. By way of example, if the input source provides randomly sensed signals, it may be desirable to initiate activation of the utilization device after a predetermined number of sensed signals or a sensed signal of predetermined duration has been received at terminal 10. Once the utilization device has been activated it may be desirable that further signals appearing at input terminal 10 not affect or reactivate the utilization device for a predetermined time. Thus, in the case of a transmission line it may be desirable that transient effects cease before another signal is placed on the line.

As hereinafter more fully explained, a feedback path 24 from the output of the pulse generator 18 initiates an inhibiting circuit 26 located in the feedback path to preclude operation of integrator-threshold 16 and thereby prevent operation of the utilization device for the disabling interval. As will be more fully explained, the duration of the disabling interval is controlled by the duration of the pulse produced by pulse generator 18.

Referring now to FIG. 2 of the drawing, the integrator-threshold circuit 16 is shown as including a resistor 28 and a capacitor 30 parallel connected between input terminal 10 and a reference point which may be ground. A threshold sensing device, such as a zener diode 32, is connected between ground and a semiconductive switch element 34. By way of example, the zener may be connected to the emitter of transistor switch element 34, the base 38 of which is connected to input terminal 10 and the collector 40 of which is connected to the input of pulse generator 18. As hereinafter explained, the output voltage from the integrator portion of the circuit, which consists of the parallel connected resistor and capacitor, builds up until it reaches a predetermined threshold level at which time transistor 34 is rendered conductive to initiate operation of the pulse generator 18. The threshold level is determined by the sum of the breakdown voltages of zener diode 32 and the collector-emitter junction of transistor 34. The threshold may be included for any desirable reason such as to preclude operation of the utilization device by random noise input signals or the like.

Pulse generator 18 advantageously may be a monostable multivibrator which exhibits quick response in transition from its OFF mode to its ON mode of operation when it is triggered by a signal such as that appearing on an output lead 42 from the threshold-integrator. Similarly, it is desirable that the multivibrator exhibit rapid response in going from its ON to its OFF modes of operation as well as drawing no power when in the OFF mode.

The monostable multivibrator includes a semiconductive switch element such as a transistor 44 having a base, emitter and collector 46, 48 and 50, respectively. A unidirectional semiconductive element such as a diode 52 is connected between emitter 48 and a terminal 54 which is connectable to a source of operating voltage V. Base 46 is connected to the junction of a resistor 56 and a capacitor 58, the other end of the resistor being attached to terminal 54. Capacitor 58 is shunted by a semiconductive switch element such as a FET 60 having a drain 62, a source 64 and a gate 66. Source 64 may be connected to terminal 54 via resistors 68 and 70 while gate 66 is connected to the junction of the two resistors and to a collector 72 of a semiconductive switch element such as a transistor 74. As hereinafter explained, FET 60 will quickly discharge any residual energy stored in capacitor 58 when the multivibrator goes from its ON mode to its OFF mode of operation.

The collector 50 of transistor 44 is connected to ground via resistors 76 and 78 and is coupled to shaper 20 by way of a lead 80. Shaper 20 may be any desirable circuit which acts to modify the output from the monostable multivibrator at lead 80. By way of example, shaper 20 is a RC differentiating network, including a capacitor 82 and a resistor 84, the juncture of which is connected to output terminal 14. It is readily apparent, of course, that any other shaper circuitry may be used if so desired. Furthermore, it is likewise apparent that the output from the monostable multivibrator may be elsewhere, such as, for example, across a transistor 74, the other switching element of the multivibrator. Thus, the output may be between a collector 72 of transistor 74. The emitter 86 of transistor 74 is connected to ground while a base 88 thereof is attached via a resistor 30 to feedback path 24.

Feedback path 24 completes a signal path from the junction of resistors 76 and 78 to inhibit circuit 26. Inhibit circuit 26 consists of a resistor 92 and a semiconductive switch element, such as a transistor 94 having a collector 96 and an emitter 98 shunting capacitor 30. A base 100 of transistor 94 completes the feedback path by way of resistor 92.

The operation of the disabling system may be best understood by reference to FIGS. 2 and 3 of the drawing wherein FIG. 3(*a*) shows the current flow in capacitor 58. As hereinbefore explained, it may be desirable to preclude delivery of an output pulse at terminal 14 to the utilization device 22 for a predetermined time interval, the delay interval, after the occurrence of a first output pulse. Prior to time $T_1$ energy signals may be applied from input signal source 12 to terminal 10. These signals tend to charge capacitor 30 until, at a time $T_1$, capacitor 30 reaches the breakdown voltage of zener 32 and the breakdown voltage of base-emitter junction of transistor 34 at which time transistor 34 is rendered conductive and a signal is passed via lead 42 to trigger the monostable multivibrator.

Referring to FIGS. 3(*b*), 3(*c*) and 3(*d*) of the drawing which show the voltages at the base 46 of transistor 44, the source 64 of FET 60 and the collector 72 of transistor 74, respectively, (as indicated on FIG. 2), it is readily apparent that prior to time $T_1$ all the transistors are OFF. Thus, the base of transistor 44, the source of FET 60 and the collector of transistor 72 are all at V volts (the voltage at terminal 54) indicating, therefore, that there is no power drain when the multivibrator is in its OFF mode of operation.

At time $T_1$, a trigger signal from integrator 16 turns ON transistor 44 via lead 42 and, as shown in FIG. 3(*b*), the voltage at base 46 drops by an amount equal to the voltage drop across diode 52 and emitter-base junction 48, 46. When transistor 44 is rendered conductive, a current path is completed from terminal 54, diode 52, the emitter-collector junction of transistor 44, resistor 76 and resistor 90 to turn ON transistor 74 and, referring to FIG. 3(*d*), clamp the collector of transistor 74 and the drain of FET 60 to approximately ground potential.

Similarly, a current path is also completed at time $T_1$ from terminal 54, diode 52, the emitter and collector of transistor 44, resistor 76 and resistor 92 in feedback path 24. The completion of this path turns ON transistor 94 in inhibiting circuit 26. Transistor 94, when rendered conductive, shorts out capacitor 30 thereby insuring that a further signals occurring at terminal 10 from input source 12 will be shunted to ground. Thus, it is readily apparent that while transistor 94 is rendered conductive by way of the multivibrator being in its ON mode of operation, no signal can be passed from terminal 10 to the utilization device.

As hereinbefore explained, at time $T_1$ transistor 44 is turned ON and base 46 drops in voltage. Since capacitor 58 is attached to base 46 and the voltage across a capacitor cannot change instantaneously, the voltage at the source of FET 60 must also drop by an equal amount as indicated in FIG. 3(*c*).

At time $T_1$, the current through capacitor 58, which is shown in FIG. 3(*a*), instantaneously changes. The current flow may be attributed to two components, the current flowing through resistor 56 and base current flowing through transistor 44, the former component being essentially constant as long as the voltage at the junction of base 46 and resistor 56 is clamped to V volts minus the drop across diode 52 and the drop across the emitter-base junction as shown in FIG. 3(*b*). The current through capacitor 58 starts to decay immediately with a time constant $\tau_1$ equal to the product of the capacitance of capacitor 58 and the resistance of resistor 68. At time $T_2$, the current flow through the capacitor decays to a point where all of the current is contributed by the current component through resistor 56 and transistor 44 turns OFF.

Upon cut off of transistor 44 at time $T_2$, transistor 74 and 94 are turned OFF. Examination of FIGS. 3(*d*) and 3(*c*) shows that the gate to source voltage across FET 60 becomes positive which, for an n-type FET, causes the FET to turn ON. Since capacitor 58 is now shunted by the low drain-to-source impedance of the ON FET, the current through the capacitor quickly reverses and decays back to zero, as indicated in FIG. 3(*a*), with a time constant $\tau_2$ equal approximately to the product of the capacitance of capacitor 58 and the drain-to-source impedance. The current reaches zero at time $T_3$, FET 60 turns OFF, and the multivibrator returns to its OFF or quiescent state.

Without FET 60, the capacitor would discharge slowly through resistors 56, 68 and 70 thus preventing rapid transition from the ON mode to OFF mode of operation of the multivibrator. Upon turn OFF of the multivibrator, the delay or disabling interval is completed, transistor 94 having turned OFF removing the shunt across capacitor 30, and signals at source 12 may again activate the utilization device. By using the FET, the interval from $T_1$ to $T_2$ may be on the order of seconds while the interval from $T_2$ to $T_3$ on the order of microseconds which enables the multivibrator to be quickly retriggered if desired.

Obviously, numerous modifications and variations of the present invention are possible in the light of the above teachings. Thus, the input to the utilization device may utilize a different shaper circuit or none at all. Furthermore, the output may be taken across a different part of the multivibrator. Similarly, other pulse producing devices and other switching circuitry may be substituted for that hereinbefore described. It is therefore to be understood that within the scope of the appended claims the invention may be practiced otherwise than as specifically described herein.

What is claimed as new and desired to be secured by Letters Patent of the United States is:

1. A signal disabling circuit coupled between a signal source and a utilization device comprising:

an integrator circuit comprising a parallel connected resistor capacitor combination connected to said source;

a threshold sensing circuit comprising a zener diode in series with a first transistor connected to said integrator for providing a trigger signal when said integrator circuit reaches a predetermined threshold value, said predetermined voltage determined by the breakdown voltages of said zener diode and said first transistor;

a monostable multivibrator coupled to said threshold sensing circuit comprising a second transistor rendered conductive upon receipt of said trigger signal, a third transistor rendered conductive when said second transistor is rendered conductive, a field effect transistor, and a capacitor shunted across said field effect transistor, said capacitor charging when said second transistor and said third transistor are rendered conductive, said capacitor rapidly discharging through said field effect transistor when said second transistor and said third transistor are rendered nonconductive thereby enabling quick retriggering of said multivibrator, said second transistor and said third transistor drawing no power in their OFF mode, and a signal inhibitor circuit including a feedback path and a fourth transistor in parallel with said integrator coupled between the output of said multivibrator and the input of said integrator for precluding the transfer of signals for a predetermined time from said source to said utilization device through said disabling circuit;

said utilization device coupled to the output of said multivibrator.

* * * * *